United States Patent
Amann et al.

(10) Patent No.: US 9,229,730 B2
(45) Date of Patent: *Jan. 5, 2016

(54) MULTI-CHIP INITIALIZATION USING A PARALLEL FIRMWARE BOOT PROCESS

(71) Applicant: International Business Machines Corporation, Armonk, NY (US)

(72) Inventors: Eberhard Amann, Rottenburg (DE); Frank Haverkamp, Tuebingen (DE); Thomas Huth, Boeblingen (DE); Jan Kunigk, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,595

(22) Filed: Dec. 17, 2014

(65) Prior Publication Data

US 2015/0106613 A1    Apr. 16, 2015

Related U.S. Application Data

(63) Continuation of application No. 13/314,733, filed on Dec. 8, 2011, now Pat. No. 8,954,721.

(51) Int. Cl.
| | |
|---|---|
| G06F 9/00 | (2006.01) |
| G06F 9/24 | (2006.01) |
| G06F 15/177 | (2006.01) |
| G06F 15/00 | (2006.01) |
| G06F 15/167 | (2006.01) |
| G06F 9/44 | (2006.01) |

(Continued)

(52) U.S. Cl.
CPC ............ *G06F 9/4405* (2013.01); *G06F 9/4401* (2013.01); *G06F 12/00* (2013.01); *G06F 9/4403* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 5,349,664 | A | 9/1994 | Ikeda et al. |
| 5,450,576 | A | 9/1995 | Kennedy |

(Continued)

FOREIGN PATENT DOCUMENTS

CN      101609406 A     12/2009

OTHER PUBLICATIONS

U.S. Appl. No. 13/314,733, 1 page.

(Continued)

*Primary Examiner* — Ji H Bae
(74) *Attorney, Agent, or Firm* — Stephen J. Walder, Jr.; Thomas E. Tyson

(57) ABSTRACT

Mechanisms, in a multi-chip data processing system, for performing a boot process for booting each of a plurality of processor chips of the multi-chip data processing system are provided. With these mechanisms, a multi-chip agnostic isolated boot phase operation is performed, in parallel, to perform an initial boot of each of the plurality of processor chips as if each of the processor chips were an only processor chip in the multi-chip data processing system. A multi-chip aware isolated boot phase operation of each of the processor chips is performed in parallel, where each of the processor chips has its own separately configured address space. In addition, a unified configuration phase operation is performed to select a master processor chip from the plurality of processor chips and configure other processor chips in the plurality of processor chips to operate as slave processor chips that are controlled by the master processor chip.

16 Claims, 9 Drawing Sheets

(51) Int. Cl.
*G06F 12/00* (2006.01)
*G06F 9/445* (2006.01)

(56) References Cited

U.S. PATENT DOCUMENTS

| | | | |
|---|---|---|---|
| 5,642,506 A | 6/1997 | Lee | |
| 5,867,702 A | 2/1999 | Lee | |
| 5,938,765 A | 8/1999 | Dove et al. | |
| 6,009,521 A | 12/1999 | Huang | |
| 6,108,781 A | 8/2000 | Jayakumar | |
| 6,158,000 A | 12/2000 | Collins | |
| 6,336,185 B1 | 1/2002 | Sargenti, Jr. et al. | |
| 6,701,429 B1 | 3/2004 | Gustafsson et al. | |
| 7,472,266 B2 | 12/2008 | Kumar et al. | |
| 7,836,293 B1 | 11/2010 | Wynia | |
| 7,908,470 B1 | 3/2011 | Cavanna | |
| 8,954,721 B2 * | 2/2015 | Amann et al. | 713/2 |
| 2008/0077774 A1 | 3/2008 | Cool et al. | |
| 2008/0184024 A1 | 7/2008 | Nicklaus et al. | |
| 2013/0060986 A1 | 3/2013 | Amann et al. | |
| 2013/0151829 A1 | 6/2013 | Amann et al. | |

OTHER PUBLICATIONS

Amann, Eberhard et al., "Integrated Link Calibration and Multi-Processor Topology Discovery", Filed Sep. 6, 2011, U.S. Appl. No. 13/226,360.

* cited by examiner

| PROCESSOR CHIP | VIRTUAL ADDR. | REAL ADDR. |
|---|---|---|
| CHIP 0 ADDRESS MAP | 0_00_0000_0000 | 0_00_0000_0000 |
|  | 0_4A_0000_0000 | 0_4A_0000_0000 |
|  | 0_FF_FFFE_0000 | 0_FF_FFFE_0000 |
|  |  |  |
| CHIP 1 ADDRESS MAP | 0_00_0000_0000 | 0_00_0000_0000 |
|  | 0_4A_0000_0000 | 0_4A_0000_0000 |
|  | 0_FF_FFFE_0000 | 0_FF_FFFE_0000 |
|  |  |  |
| CHIP 2 ADDRESS MAP | 0_00_0000_0000 | 0_00_0000_0000 |
|  | 0_4A_0000_0000 | 0_4A_0000_0000 |
|  | 0_FF_FFFE_0000 | 0_FF_FFFE_0000 |
|  |  |  |
| CHIP 3 ADDRESS MAP | 0_00_0000_0000 | 0_00_0000_0000 |
|  | 0_4A_0000_0000 | 0_4A_0000_0000 |
|  | 0_FF_FFFE_0000 | 0_FF_FFFE_0000 |

*FIG. 3*

| PROCESSOR CHIP | VIRTUAL ADDR. | REAL ADDR. |
|---|---|---|
| CHIP 0 ADDRESS MAP | 0_00_0000_0000 | 0_00_0000_0000 |
| | 0_4A_0000_0000 | 0_4A_0000_0000 |
| | 0_FF_FFFE_0000 | 0_FF_FFFE_0000 |
| | | |
| CHIP 1 ADDRESS MAP | 0_00_0000_0000 | 1_00_0000_0000 |
| | 0_4A_0000_0000 | 1_4A_0000_0000 |
| | 0_FF_FFFE_0000 | 1_FF_FFFE_0000 |
| | | |
| CHIP 2 ADDRESS MAP | 0_00_0000_0000 | 2_00_0000_0000 |
| | 0_4A_0000_0000 | 2_4A_0000_0000 |
| | 0_FF_FFFE_0000 | 2_FF_FFFE_0000 |
| | | |
| CHIP 3 ADDRESS MAP | 0_00_0000_0000 | 3_00_0000_0000 |
| | 0_4A_0000_0000 | 3_4A_0000_0000 |
| | 0_FF_FFFE_0000 | 3_FF_FFFE_0000 |

*FIG. 4*

| PROCESSOR CHIP | VIRTUAL ADDR. | REAL ADDR. |
|---|---|---|
| CHIP 0 ADDRESS MAP | 0_00_0000_0000 | 0_00_0000_0000 |
| | 0_4A_0000_0000 | 0_4A_0000_0000 |
| | 0_FF_FFFE_0000 | 0_FF_FFFE_0000 |
| | 1_00_0000_0000 | 1_00_0000_0000 |
| | 1_4A_0000_0000 | 1_4A_0000_0000 |
| | 1_FF_FFFE_0000 | 1_FF_FFFE_0000 |
| | 2_00_0000_0000 | 2_00_0000_0000 |
| | 2_4A_0000_0000 | 2_4A_0000_0000 |
| | 2_FF_FFFE_0000 | 2_FF_FFFE_0000 |
| ... | ... | ... |
| CHIP N ADDRESS MAP | 0_00_0000_0000 | 0_00_0000_0000 |
| | 0_4A_0000_0000 | 0_4A_0000_0000 |
| | 0_FF_FFFE_0000 | 0_FF_FFFE_0000 |
| | 1_00_0000_0000 | 1_00_0000_0000 |
| | 1_4A_0000_0000 | 1_4A_0000_0000 |
| | 1_FF_FFFE_0000 | 1_FF_FFFE_0000 |
| | 2_00_0000_0000 | 2_00_0000_0000 |
| | 2_4A_0000_0000 | 2_4A_0000_0000 |
| | 2_FF_FFFE_0000 | 2_FF_FFFE_0000 |
| | ... | ... |

MULTI-CHIP INITIALIZATION USING A PARALLEL FIRMWARE BOOT PROCESS

This application is a continuation of application Ser. No. 13/314,733, filed Dec. 8, 2011, status allowed.

BACKGROUND

The present application relates generally to an improved data processing apparatus and method and more specifically to mechanisms for performing multi-chip initialization using a parallel firmware boot process.

Booting a multi-chip system with tightly coupled processors is a substantial exercise in server system designs. Since many of the hardware elements of the multi-chip system are not initialized yet, e.g., memory or inter-processor buses, mechanisms which are used by operating systems to create parallelism cannot be used by the initializing firmware immediately after power-on of the multi-chip system. Thus it is not uncommon today to perform the initialization of a multi-chip system utilizing only a single task that is either running on a service processor or running on one of the processors of the multi-chip system. This serializes the boot process making it a relatively slow process. This approach does not scale when increasing the number of the involved processor chips.

For example, multi-chip initialization in a symmetric multiprocessor (SMP) architecture is traditionally performed in one of two ways. In one methodology, the whole process is performed by an external service processor in an out-of-band fashion. In these SMP architecture designs, a central resource which is external to the processor is used to configure all of the chip-components such that they are configured correctly with unique addresses on the inter-processor bus. The initialization can be parallelized and sped up to the degree that the external service processor is able to provide. This model is predominant in many server architecture designs.

In other designs solutions one of the plurality of processors is assigned the role of a master and does the majority of the boot process alone via the inter-processor bus, which is configured to support early low-speed operation right from power-on. Here again, however, the possibility for parallelism in the boot process is very limited due to the initialization operations of the boot process being primarily performed by a single processor.

There are also known architectures where portions of the system are set up to operate in parallel at initialization time. However, these implementations suffer certain disadvantages. In order to parallelize the boot process, each processor needs a customized version of the basic input/output system (BIOS) code that is customized to account for the position of each chip in the multi-chip configuration, especially with regard to system addresses. This can either be addressed via time-consuming address relocation of the firmware images during runtime, which slows down the boot process, or the need for multiple firmware images stored in the boot memory device(s), which requires a larger amount of storage space. These implementations also need one or more synchronization points between the parallel boot phases, which slows down the boot process as well. Another significant disadvantage of such approaches is an increase in complexity for firmware updates as well as more complex maintainer-ship of the code releases by development teams.

SUMMARY

In one illustrative embodiment, a method, in a multi-chip data processing system, for performing a boot process for booting each of a plurality of processor chips of the multi-chip data processing system is provided. The method comprises performing, in parallel, a multi-chip agnostic isolated boot phase operation to perform an initial boot of each of the plurality of processor chips as if each of the processor chips were an only processor chip in the multi-chip data processing system. The method further comprises performing, in parallel, a multi-chip aware isolated boot phase operation of each of the processor chips where each of the processor chips has its own separately configured address space. In addition, the method comprises performing a unified configuration phase operation to select a master processor chip from the plurality of processor chips and configure other processor chips in the plurality of processor chips to operate as slave processor chips that are controlled by the master processor chip.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example of an initial virtual (or effective) address to real address mapping for a multi-chip agnostic phase in accordance with one illustrative embodiment;

FIG. 4 is an example of an updated virtual to real address mapping that may be generated for each of the processor chips during a multi-chip aware phase in accordance with one illustrative embodiment;

FIG. 6 is an example diagram of a virtual to real address mapping that may be generated as part of a final unified configuration during a unified configuration phase in accordance with one illustrative embodiment;

DETAILED DESCRIPTION

Figure 1A:
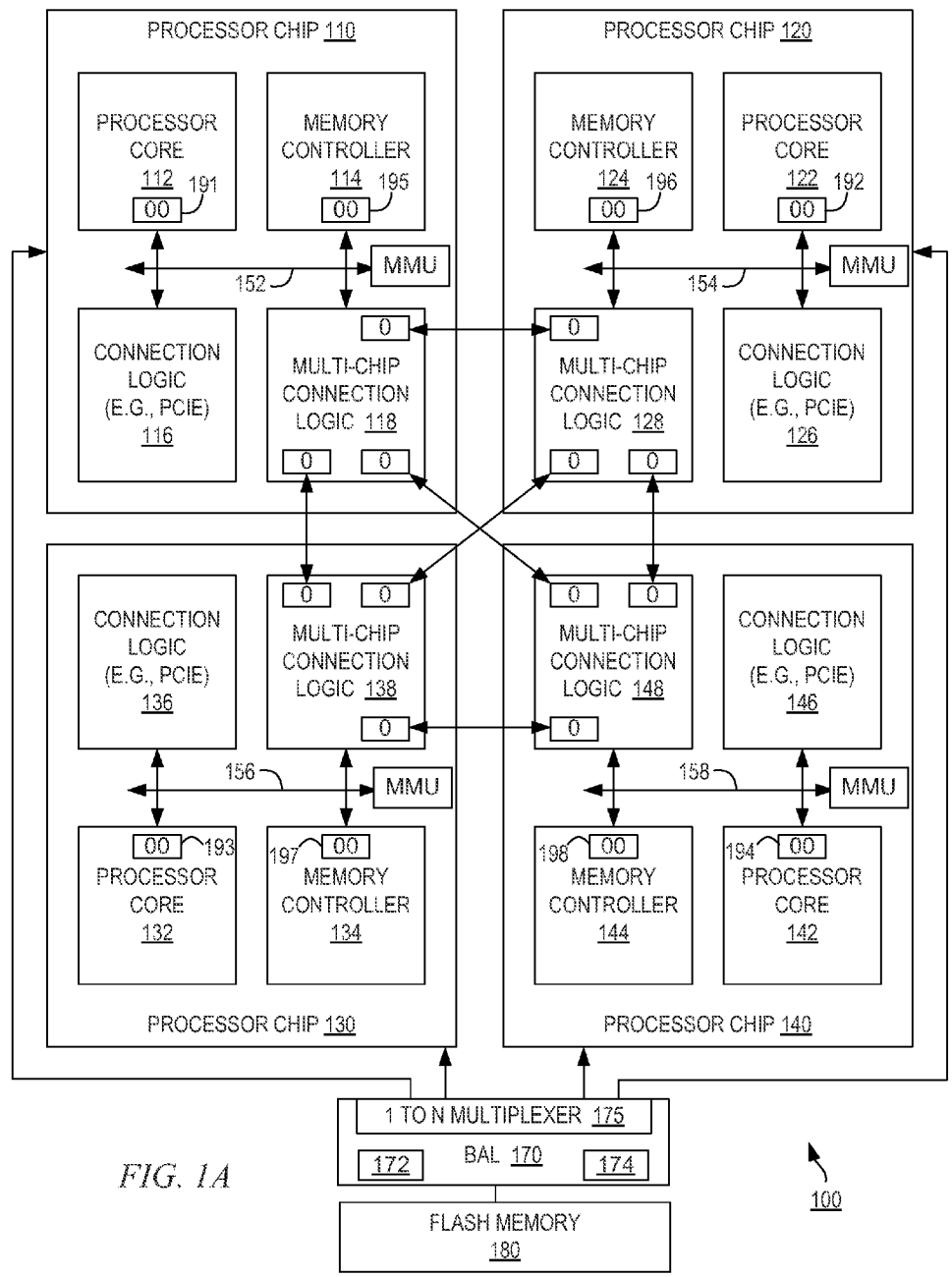
FIG. 1A is an example block diagram illustrating a multi-chip system during a multi-chip agnostic phase in accordance with one illustrative embodiment.

The illustrative embodiments provide a mechanism for performing multi-chip initialization using a parallel firmware boot process. The illustrative embodiments use a parallel approach to booting a multi-chip system with the assistance of firmware. The same firmware code is executed on all of the processor chips from the initiation of the boot process until late in the boot process. After a parallel initialization phase the inter-processor link is setup and one processor chip takes over control as the master-chip. The result is a coherent multi-processor boot process with each processor chip having its own individual physical-address-map and configuration.

As recognized by the present inventors, in a multi-processor chip system (also referred to simply as a multi-chip system) where all individual processors can be started in parallel, such as a symmetric multiprocessor (SMP) system, heterogeneous multiprocessor system (such as the Cell Broadband Engine architecture available from International Business Machines Corporation), or the like, the task of system initialization can be parallelized to a large degree. The illustrative embodiments solve the problems noted above with regard to limited resources after power-on by having each processor started as if it would be a single processor of a single processor system. During the boot-process each processor obtains its own identifier which determines the required physical address space of the components connected to the inter-processor bus.

Firmware is used to setup each of the processors' physical-address space. Every unit attached to the inter-processor bus is configured with its individual system-wide unique address area before the inter-processor bus needs to be re-activated to operate in a system-wide manner. Thus, coherent access to resources, such as memory, becomes possible from one chip to the other in the multi-chip system. The system initialization is finished by one chip gaining control over the other involved processor chips, i.e. becoming the master-chip, such that just one instance of the firmware is finally running.

The illustrative embodiments provide mechanisms to keep the system initialization as parallel as possible, and therefore as fast as possible, since the parallel tasks run independently from each other until very late in the boot process. Furthermore the illustrative embodiments provide mechanisms by which one firmware object-code can be executed on N different processors in parallel, before the execution flow of the firmware binary is reduced to just one instance being executed on the master-chip.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof. Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1B:
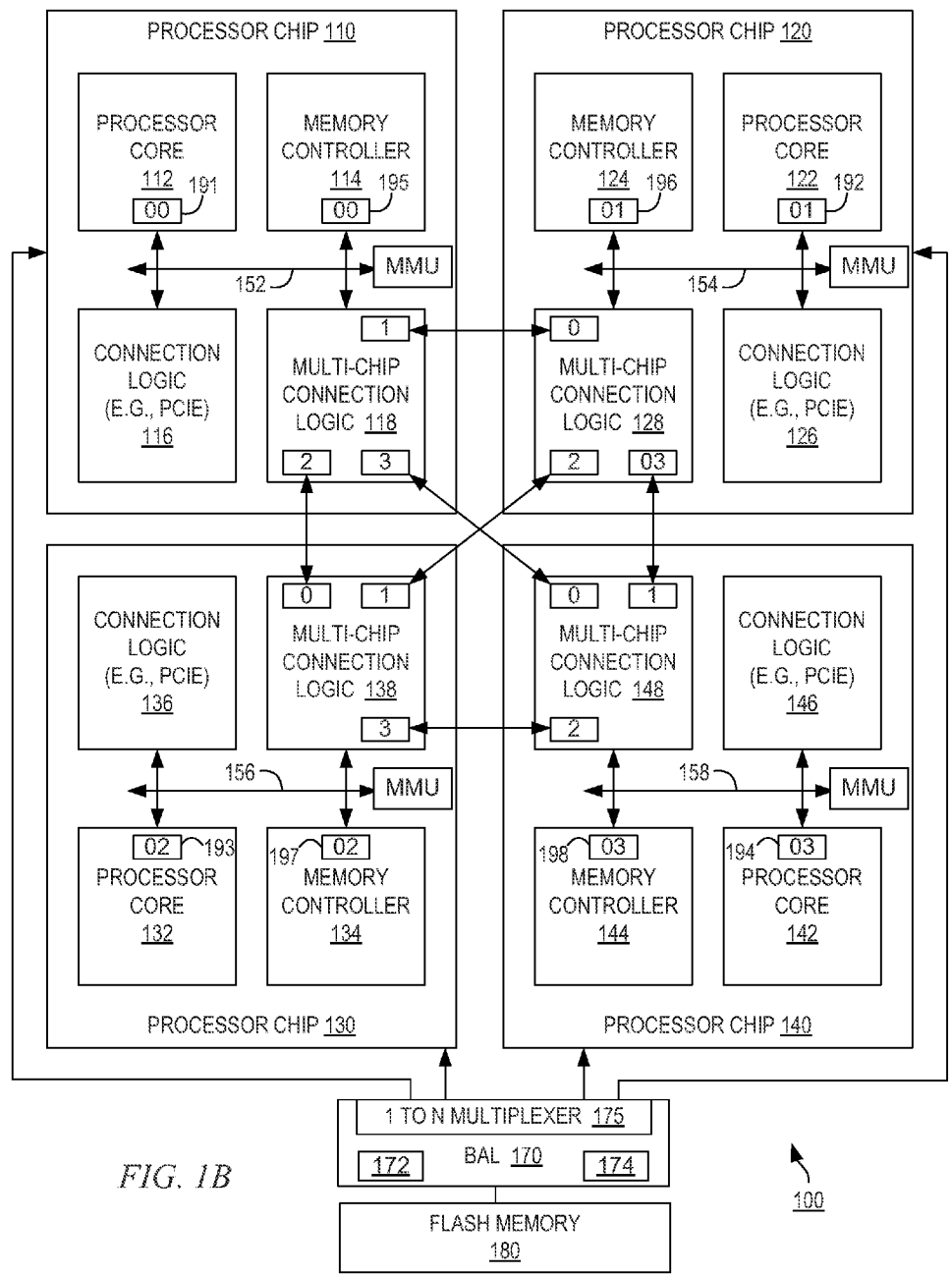
FIG. 1B is an example block diagram illustrating a multi-chip system during a multi-chip aware phase in accordance with one illustrative embodiment.

To better understand the operation of the mechanisms of the illustrative embodiments, it is helpful to understand how a multi-chip system is configured and how information is interchanged between the plurality of processor chips. FIGS. 1A and 1B are example block diagram illustrating a multi-chip system in accordance with one illustrative embodiment. As shown in FIGS. 1A and 1B, the multi-chip system 100 includes a plurality of processor chips 110, 120, 130, and 140, each having functional units coupled to a processor chip bus 152, 154, 156, and 158, respectively. Each of the processor chips 110, 120, 130, and 140 comprises one or more processor cores 112, 122, 132, and 142, a memory controller 114, 124, 134, and 144, connection logic 116, 126, 136, and 146 for connecting to peripheral devices, e.g., peripheral component interconnect express (PCIe) logic or the like, and multi-chip connection logic 118, 128, 138, and 148 for providing a communication connection between the processor chips 110, 120, 130, and 140. The processor cores 112, 122, 132, and 142 comprise chip id registers 191-194 and the memory controllers 114, 124, 134, and 144 comprise corresponding chip id registers 195-198. Any other component which is connected to the inter-processor bus may also have such a chip-id register which is used to identify the unit uniquely on the inter-processor-bus, e.g. built-in Network-hardware, accelerators and the like. These registers are populated with a chip identifier, which is a unique identifier for each chip which may be based on an increasing numerical value or may be arbitrarily selected as long as it is unique to the chip, and which is obtained from the boot-assist-logic (BAL) 170 as described hereafter.

While the depicted example illustrates a multi-chip system 100 having four processor chips 110, 120, 130, and 140, the present invention is not limited to such. Rather the multi-chip system 100 may comprise any number n processor chips greater than 1. In one illustrative embodiment, the bus 152, 154, 156, and 158 may be a low-speed bus to which the processor chips 110, 120, 130, and 140 are connected, such as by way of a low pin count (LPC) connection or other suitable connection depending upon the particular implementation.

In one illustrative embodiment, each of the processor's LPC master pins in the LPC connection to the bus 152-158 is connected to boot-assist-logic (BAL) 170. The BAL 170 may be implemented, in one illustrative embodiment, as a field programmable gate array (FPGA) 170 or other multiplexing logic which is responsible for bus-arbitration between the processor chips 110, 120, 130, and 140. The LPC connection provides access to a flash memory chip 180 or other memory device which stores code and data for the host firmware responsible for initializing the multi-chip system 100. There is only one host firmware image which is shared between the n chips 110, 120, 130, and 140 by way of the 1-to-n multiplexer 175 functionality of the boot-assist-logic 170. In other embodiments all processors may be connected to the flash-memory via an multi-master capable i2c bus.

In the illustrative embodiment, the boot-assist-logic 170 provides a port register 172 where each processor chip 110, 120, 130, and 140 can read out its associated boot-assist-logic port number. This number is interpreted by the mechanisms of the illustrative embodiments as the chip-id which is used to configure the upper bits of a physical-address space for the corresponding processor chip as well as to configure the routing tables of the high-speed bus interconnect. In alternative embodiments, however, instead of using the port-number, the illustrative embodiments may also use mechanisms, such as boot-strap pins to acquire the chip-id.

In yet another illustrative embodiment, where all processors are connected to the flash-memory via a multi-master capable i2c bus, the chip-id may be determined by means of software only. Such embodiment may employ a software semaphore for a single chip out of the plurality of chips to be the first to win arbitration for the semaphore in order to acquire the number 0 and increase the number by one, both in atomic fashion. The next chip to win arbitration would acquire the number 1 and atomically increase the next number to be acquired to 2, and so on. The chip-ids assigned to the various chips need not be numerical or even sequential as long as they are unique to each chip. In the illustrative embodiment the boot-assist-logic 170 may further comprise a scratch memory 174 that is used by the master processor chip to coordinate the takeover of control of the processor chips 110, 120, 130, and 140 of the multi-processor system 100.

In the depicted example, the processor chip with a processor chip-id 0 is declared as the master/director which has the role to execute/coordinate the take-over of control of the processor chips 110, 120, 130, and 140 of the multi-chip system 100. Taking chip-id 0 as the master/director is just for convenience and instead, there can be different methods to implement the master/director selection without departing from the spirit and scope of the illustrative embodiments. For example, a dynamic method helps to recover in situations where one of the processor chips might not be available for an unknown reason (degraded boot).

High speed multi-chip connection logic 118, 128, 138, and 148 provide communication pathways for each processor chip 110, 120, 130, and 140 to communicate with each other processor chip 110, 120, 130, and 140. The high speed multi-chip connection logic 118, 128, 138, and 148 may store the chip-ids for the various connections with the other processor chips 110, 120, 130, and 140 in corresponding registers of the multi-chip connection logic 118, 128, 138, and 148. As will be described hereafter, these registers initially are fully un-configured and store the master chip id, i.e. chip-id 0, for each of the other processor chips but then, after configuration through the operation of the mechanisms of the illustrative embodiments, store the actual chip-ids assigned to the various processor chips 110, 120, 130, and 140.

With the multi-chip system 100 configuration of one illustrative embodiment, common resources, accessible via the low-speed bus connections 152-158 of the processor chips 110, 120, 130, and 140, include the flash memory chip 180 that stores boot code, a port number register 172 of the boot-assist-logic 170, and a scratch memory 174 of the boot-assist-logic 170. The utilization of these common resources along with the multi-chip connection logic 118, 128, 138, and 148 to perform a parallel multi-chip boot process will hereafter be described.

Figure 2:
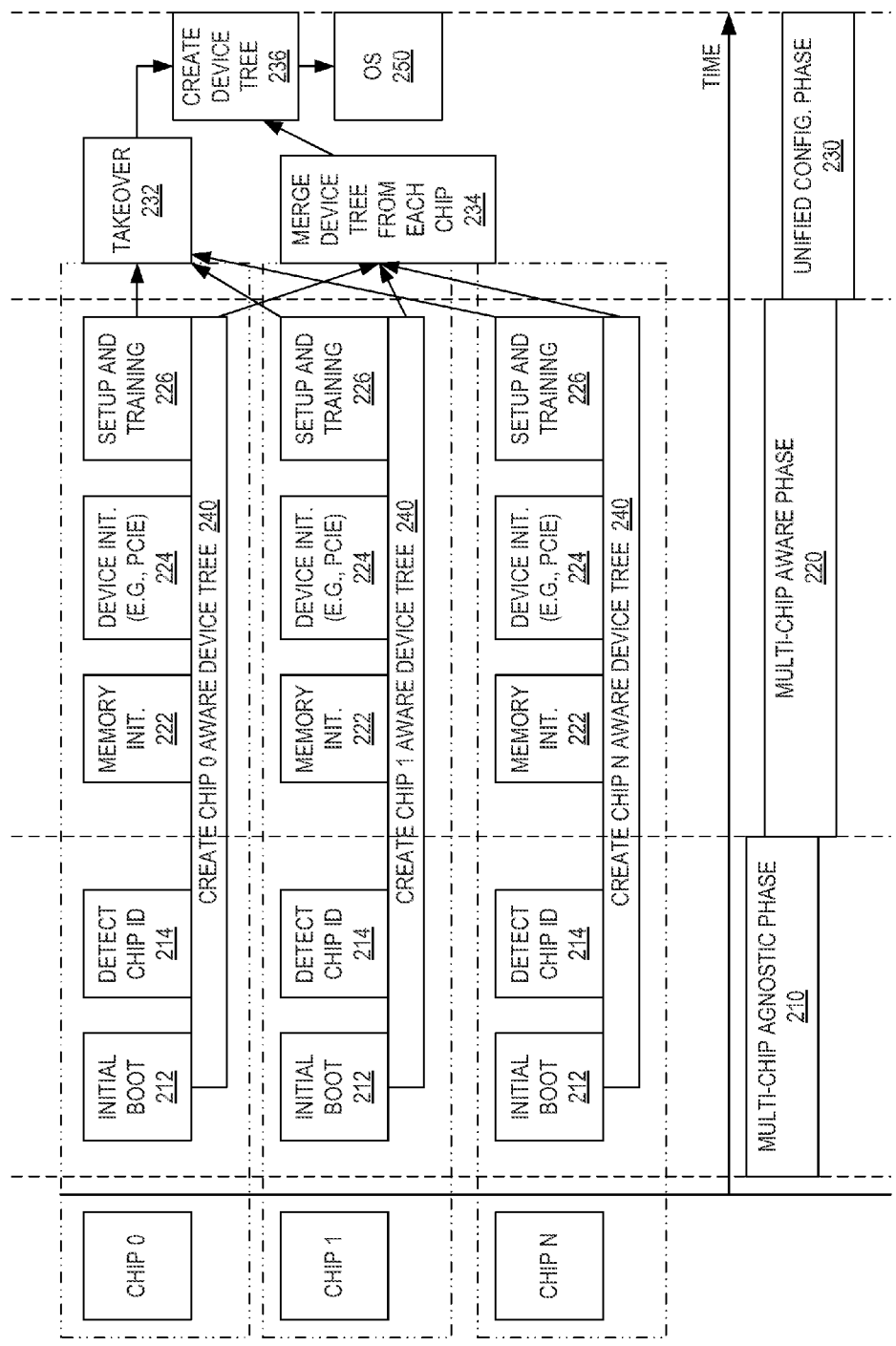
FIG. 2 is a block diagram illustrating a parallel multi-chip boot process flow for a four processor chip system in accordance with one illustrative embodiment.

FIG. 2 is a block diagram illustrating a parallel multi-chip boot process flow for a four processor chip system in accordance with one illustrative embodiment. As discussed above, while the illustrative embodiments are described with regard to a four processor chip multi-processor system, the illustrative embodiments are not limited to such. As will be readily apparent to those of ordinary skill in the art in view of the present description, the parallel multi-boot process flow may be modified to accommodate any number of processor chips of two or more without departing from the spirit and scope of the illustrative embodiments.

As shown in FIG. 2, the parallel multi-chip boot process flow comprises three primary phases 210, 220, and 230. A first phase 210 is the multi-chip agnostic isolated parallel hoot-phase 210, hereafter referred to simply as the multi-chip agnostic phase 210, which occurs before physical-address-map adjustment as described hereafter. A second phase 220 is multi-chip aware isolated parallel boot phase, hereafter referred to simply as the multi-chip aware phase 220, which occurs after physical address map adjustment as described hereafter. A third phase 230 is the unified system configuration phase which occurs after a final physical-address-map of the processor chips.

These phases 210-220 are executed in parallel on each of the processor chips by firmware previously loaded onto each of the processor chips. This parallel execution causes the performance of the booting of the processor chips to be comparable to the booting of a single chip. In general, the time to perform the boot process on all of the processor chips is primarily dependent on the memory setup operations and the peripheral device bus, e.g., PCIe bus, configuration.

As shown in FIG. 2, the multi-chip agnostic phase 210 comprises an initial boot operation 212 and a chip identifier detection operation 214.

The multi-chip aware phase 220 comprises a memory initialization operation 222, a device initialization operation 224, and a multi-processor setup and training operation 226. The final goal of the firmware boot process is to enable an operating system to boot on the multichip system. In support of this goal the firmware collects a comprehensive description of the system and stores it in a data structure referred to herein as the system configuration table. Popular industry-standard implementations of such data structures are ACPI tables in the x86 processing architectures, or alternatively a device tree in Power/PowerPC processing architectures. During these phases 210 and 220, a chip aware system configuration table creation operation 240 is being performed in conjunction with the other operations. The unified system configuration phase 230 comprises a takeover operation 232, and a merge operation 234 for merging the system configuration tables for the various processor chips created by the chip aware system configuration table creation operation 240. A resulting unified system configuration table is created by the system configuration table creation operation 236 and provided to the operating system 250. These phases and their operations will be described hereafter in greater detail.

In the initial phase, i.e. the multi-chip agnostic isolated boot phase 210, each individual processor chip does not yet have the information that it will be used in a multi-chip system, e.g., it has a processor chip id of 0 indicating that it is the master or only processor chip in the system. Thus, each processor chip is initialized as if it is the only processor chip in the system and sets up its logic and configuration structures that do not require knowledge about the multi-chip nature of the final configuration. For example, in some architectures, processor chips are split into "chiplets" which can be configured at this point in time of the boot operation as well as enabling clocking, performing repair activities, adjusting phase lock loops (PLLs), and other configuration operations that do not require knowledge of the multi-chip configuration of the system as a whole.

One such configuration structure that may be set up during this phase is a virtual to real address mapping structure which may be implemented in hardware of a memory management unit (MMU) of the processor chip, the memory controller 114, 124, 134, and 144, or the like. The virtual to real address mapping structure of the MMU is part of the processor chip logic and stores a mapping for all required address spaces. The virtual to real address mapping structure, also referred to as simply the virtual to real address mapping or just an address mapping, may comprise one or more table data structures defining the mapping of addresses from one address to another. These one or more table data structures may be stored in memories, registers, or the like, for use in performing address mapping operations.

Each of the processor chips have their virtual to real address mapping structures configured identically during the multi-chip agnostic isolated boot phase 210. An example of one such initial virtual (or effective) address to real address mapping structure is as shown in FIG. 3, which depicts the information of the mapping structure that may be stored in a hardware element of the MMU, for example. The virtual to real address mapping structure may be set up by the processor chip itself as part of a MMU reconfiguration operation, for example. During the multi-chip agnostic isolated boot phase 210 the virtual to real address mapping structure is the same for each processor chip.

The initial virtual to real address mapping for the part of the firmware executed in flash memory 180 is set as a result of a chip reset operation. In one illustrative embodiment, the initial boot operation 212, that is executed in response to a power-up of the processor chip, is executed from the flash memory 180 first, before the boot code in the flash memory 180 is loaded into the processor cache. Once the boot code transitions from the flash memory 180 to the processor cache, the boot code continues to execute from the processor cache.

Thus, during the initial boot operation 212 of the multi-chip agnostic isolated boot phase 210, each of the processor chips have their respective virtual to real address mappings configured as if they were the only processor chip in the system. Furthermore, as shown in FIG. 3, the virtual address and real addresses are set to be identical. Thus, for example, the initial setup of each chip-unit is such that the chip unit would work for a single or master chip 0. In order to access the chip-unit, a proper MMU virtual to real address mapping is necessary to be able to access the chip-unit. Therefore the mechanisms of the illustrative embodiments set up a mapping of "virtual equals physical," based on a knowledge of how the chip-unit is accessible directly after reset. In the multi-chip aware phase 220, described hereafter, the real addresses of any processor's virtual to real mapping are changed to contain an offset directly related to the respective chip-id of the particular processor. Since the processor chip has early access to the chip-unit (by way of the virtual=physical address mapping set up), the processor chip can access registers of the chip-unit. Once the resource which controls the physical address of the chip-unit on the bus starts its operation, the MMU virtual to real address mapping is reconfigured again, as described hereafter, because the chip-unit will appear at a different physical address on the bus than before.

Following the initial boot operation 212, a detect chip id operation 214 is executed by the firmware on each chip during the multi-chip agnostic isolated boot phase 210. In the illustrative embodiment, the detect chip id operation 214 involves the firmware of the processor chip reading its corresponding processor chip identifier (id) from a corresponding register 172 of the boot-assist-logic 170, i.e. the boot-assist-logic port number which is interpreted to be the processor chip id. That is, the processor chip has a physical connection to one of the ports of the boot-assist-logic 170 and this port has an associated port number register 172, as shown in FIG. 2. The port number is read from the port number register 172 associated with the port to which the processor chip is attached and this is stored as the processor chip id in a register 191-198 in the processor core and memory controller of the processor chip to indicate that processor chip's id. As indicated previously, the detect-chip-id operation 214, in an alternative embodiment, may be conducted by the order in which a semaphore is won amongst the plurality of chips. The semaphore may be implemented with hardware support or entirely in software on the basis of the commonly accessible flash-memory 180. At this point of the multi-chip parallel boot operation, the firmware running on each of the processor chips is aware that the processor chip will be used in a multi-chip system.

Following the multi-chip agnostic isolated boot phase 210, the multi-chip aware isolated parallel boot phase 220 is performed by the firmware of the processor chips. That is, after the chip-id is detected 214, the firmware of the processor chips, which is executed from flash memory 180, configures the processor cache as part of a memory initialization operation 222. Here the chip-id is used to fill the cache correctly such that the data in the cache of the processor chip appears at its correct physical address location. An MMU setting for the cache is set up as part of this memory initialization operation 222 such that the cache can be accessed. This MMU setting is as shown in FIG. 4, described hereafter. This mechanism enables the firmware contained in a singular equal code image running on all processors in parallel to access and program all of the chip-units in the same fashion, however the individual accesses to the chip's resources are materialized in a chip-specific fashion, i.e. with the chip-specific address offset. The firmware then copies itself into the initialized cache of the processor chip.

Other devices and chip-units of the processor chips are initialized 224 on the basis of the detected chip id 214. In one illustrative embodiment, in addition to the chip-id information, another bit accessible via the boot-assist-logic 170 is exploited to distinguish single and multi-chip setup (in some illustrative embodiments, a boot-strap pin can be utilized for this purpose). By accessing the value of this bit, the firmware executing on the processor chip is made aware of whether the processor chip is a single processor chip or is one of a plurality of processor chips in a multi-chip architecture. As a result, the firmware knows that the virtual to real address mapping of the processor chip needs to be reconfigured uniquely for the processor chip and the functional units of the processor chip that are connected to the processor bus are to be reconfigured according to the configured virtual to real address mapping structure.

During the multi-chip aware phase 220, the boot code execution continues in cache-memory residing in a physical address space which has already been configured to be accessed with the final virtual to physical address mapping setup of the processor chip as part of the setup and training operation 226. Moreover, during this operation 226, the virtual to physical address mapping structure in the processor chip is reconfigured with a unique and separate physical address space for the processor chip when compared to other processor chips.

An example of the updated virtual to physical address mapping that is generated for each of the processor chips is shown in FIG. 4. In this example, the uppermost 2 bits reflect the chip id which is unique to each processor chip. The memory controller (MC) in the processor chip is configured to service the correct physical address range based on the chip id information stored in the memory controllers chip id register 195, 196, 197, and 198 described previously. As a result of this updating of the virtual to real address mapping, the boot process continues in a copy of boot code in the cache now accessible via the recently established mapping. Thus, the processor chips are transitioned from an isolated boot operation where they believe that they are the only processor chip in the system, to a multi-chip aware boot operation in which their boot instructions are present at separate and unique physical address spaces associated with the individual processor chips. It should be appreciated, however, that the use of the chip id of an individual processor for uniquely identifying the address mappings of a particular processor is just one example implementation of the illustrative embodiments and other mechanisms for performing such functionality may be used without departing from the spirit and scope of the illustrative embodiments.

Not only the memory used for program execution and data storage is updated by updating the virtual to real address mapping, but the I/O addresses of the processor chip are also handled in a similar way, e.g., the 0_4A_0000_0000 address region which holds the processor chip registers in the example illustrative embodiment. This allows the initialization code which is running on a single chip system to be entirely reused. For example, initialization code running on a first processor chip M will access a register at address 0_4A_0000_0000. Due to the virtual to real address mapping, the real address accessed corresponds to register M_4A_0000_0000 instead. Using the virtual to real address mapping for I/O ranges allows reusing the initialization code for any chip in the system without any modification. Thus, initialization of the chips may be performed in the exact same fashion across all of the processor chips in the system without the need for maintaining multiple copies of the initialization code, relocating the initialization code during boot time, or parameterizing the initialization code beyond what is necessary to accommodate different unique chip identifiers. To the contrary, the state of the art prior to the present invention requires that the firmware images be relocated by a software loader at boot time just before execution in order to have the address-references contain within the firmware image correspond to the respective chip they are executed on.

After the execution of the multi-chip aware phase 220, the virtual to real address mapping of each of the processor chips within the multi-chip system are properly configured with unique addresses pointing to unique and separate address spaces associated with the particular processor chips. At this point, one of the processor chips has been configured to be a master chip, i.e. a master chip having chip id 0, and the other processor chips are configured as slave chips, i.e. having chip ids other than chip id 0, e.g., chip id 1, 2, and 3 in the depicted example. This is shown in the example configuration of FIG. 1B. As shown in FIG. 1B, the chip ids in the multi-chip connection logic 118, 128, 138, and 148, processor cores 112, 122, 132, and 142, memory controller 114, 124, 134, and 144, and the like, have been updated to store the proper unique chip ids of the processor chips 110-140. Thus, each of the slave processor chips contain virtual to real address mappings that are adjusted to point to their own separate address space which allows the same code to be run on each of the individual processor chips. The master processor chip has a virtual to real address mapping in which the virtual address equals the real address.

To get to a final system configuration, the master processor chips needs to gain control over the slave processor chips. The master processor chip can access resources in the slave processor chips using the inter-processor bus provided by way of the multi-chip connection logic 118, 128, 138, and 148 of the processor chips 110, 120, 130, and 140. This inter-processor bus is setup prior to the takeover operation 232 in the unified configuration phase 230 and may be setup in a manner such as described in commonly owned U.S. Pat. No. 8,954,639, which is hereby incorporated by reference.

After the multi-chip aware phase 220 and setup of the inter-processor bus provided by the multi-chip connection logic 118, 128, 138, and 148, a takeover mechanism 232 is used to create the system configuration table 236 which provides the mechanism by which the master processor chip reconfigures the slave processor chips to generate the final system configuration and MMU setup. It should be noted that a memory management unit (MMU) is a chip unit entirely disjoint of the Memory-controller chip-unit (MC). The MMU handles virtual-to-real address translation which is needed in computing architectures to make an operating systems run hundreds of user processes concurrently. The MC, in turn, is responsible to execute read and write operations to physically attached memory modules, such as DRAM, for example, by implementing a bus protocol, such as DDR3 or the like. At the beginning of the takeover all slave chips exhibit a virtual-to-physical mapping in which the physical portion carries the offset corresponding to the processor's chip-id. The virtual address map, however still starts at 0. The master processor chip controls the slave processor chips via the inter-processor bus, via architected registers in the slave processor that are accessible to the master via the inter-processor bus. These registers are used to change the processor core's MMU setup as well as its internal registers, including the instruction address register (IAR). These registers appear at a unique address on the inter-processor bus address mapping.

Figure 5:
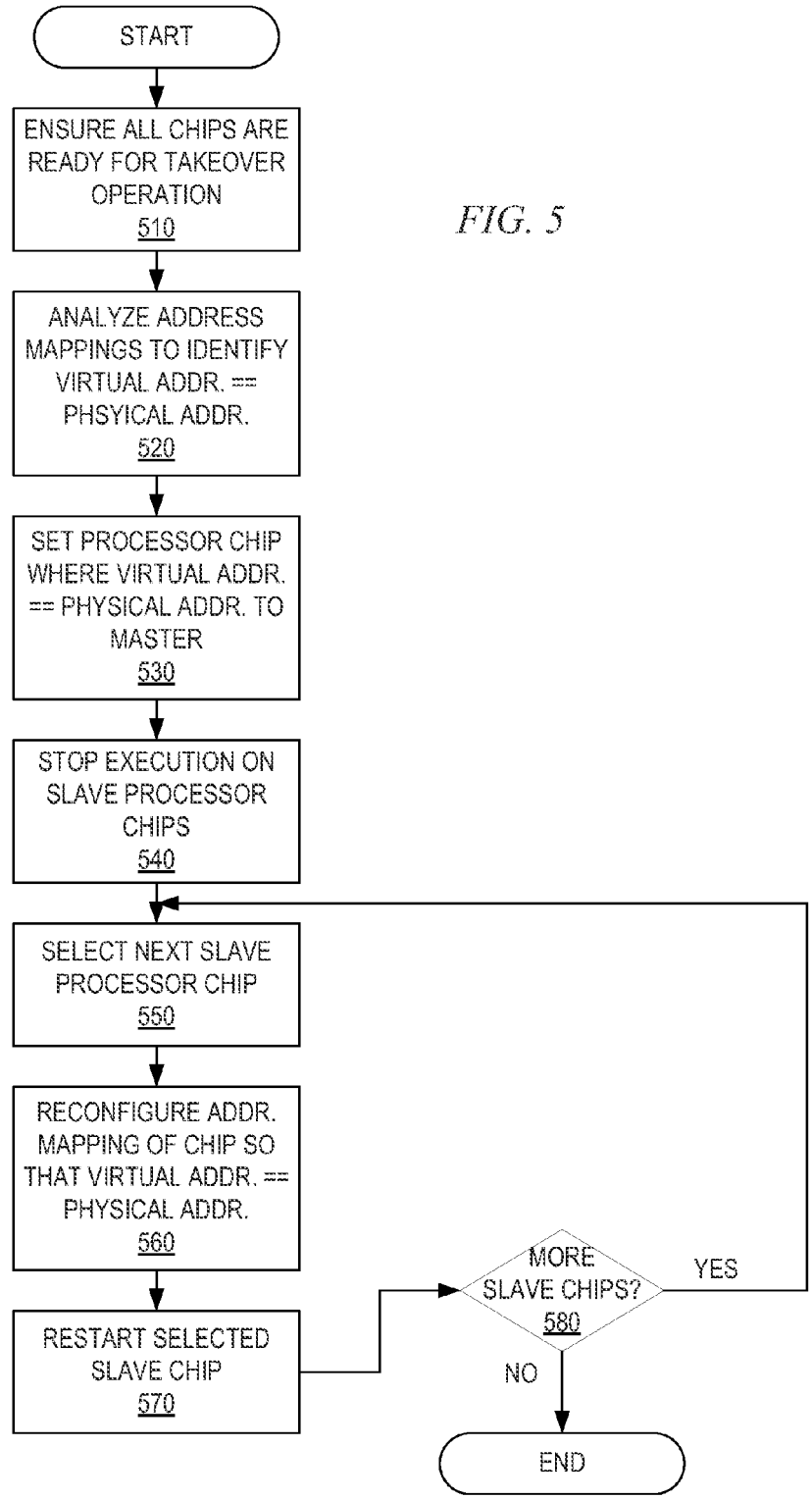
FIG. 5 is a flowchart outlining an example operation of a takeover mechanism for generating a final unified configuration of a multi-chip system in accordance with one illustrative embodiment.

FIG. 5 is a flowchart outlining an example operation of the takeover mechanism 232 for generating the final unified configuration of the multi-chip system in accordance with one illustrative embodiment. The operation outlined in FIG. 5 may be performed by the firmware of the master processor which implements a takeover mechanism for taking over control of the slave processor chips.

As shown in FIG. 5, the operation starts by first ensuring that every processor chip is ready for the takeover operation to be performed by completing all of their currently allocated initialization tasks required before the takeover operation can be performed (step 510). On each of the processors the firmware checks if the virtual-to-physical address mapping has a predetermined configuration that only the master processor can hold at this point. In the illustrative embodiment, the predetermined configuration is that the virtual address is the same as the physical address. The processor on which this check holds true is selected to be the master processor chip (step 530) while the other processor chips have their program execution stopped, waiting until the takeover operation is completed by the master processor chip (step 540). At this phase in the boot operation, the multi-chip links of the inter-processor bus provided by the multi-chip connection logic of the processor chips is already working and thus, the master processor chip can reconfigure the other processor chips, such as by way of internal debugging mechanisms or the like.

The next processor chip that is not the master processor chip, i.e. a slave processor chip that has a virtual address space that is not equal to the real (or physical) address space, is selected (step 550). The virtual to real address mapping of that processor chip is reconfigured such that the virtual address space matches the physical address space of the master processor chip (step 560). This may be done by generating the correct mapping parameters, e.g., virtual address, physical address, size and access permissions, and write this information to a MMU virtual to real address mapping structure entry. At the end of this step, each processor exhibits a 1:1 virtual-to-physical mapping, where each of these mappings are the same across the plurality of processors and enable each chip to access any chip's resources via the inter-processor bus, e.g., the effective address 0 now points to real address 0 on all processors and will lead to accessing the chip-unit mapped to real address 0 residing on chip 0 in the illustrative embodiment, thus making that chip-unit effectively accessible via address 0 from all processors.

The slave processor chip previously executed code from its local memory, e.g., its local L2 cache, by virtue of the virtual to real address mapping setup during the multi-chip aware phase 220. By way of the change in virtual to real address mapping performed as part of step 560, the instruction address register (IAR) of the slave processor chip points to the memory of the master processor chip so that the master processor chip now controls the operation of the slave processor chip. The selected slave processor chip may now be restarted (step 570) and will continue to use the final virtual to real address mapping which points to a common memory address space for code and data.

A determination is made as to whether all slave processor chips have been reconfigured (step 580). If not, the operation returns to step 550 with the next slave processor chip being selected. If all of the slave processor chips have been reconfigured, then the operation terminates. Although the operation is shown as terminating with regard to the reconfiguration of the slave processors, this does not mean that all operations terminate. To the contrary, the multi-chip system continues with any subsequent boot operations and execution of code suitable to the particular implementation.

After the takeover mechanism 232 completes its reconfiguration operation as outlined in FIG. 5, the resulting virtual to real address mapping in each of the processor chips is identical. An example of this virtual to real address mapping structure after the takeover mechanism reconfiguration is shown in FIG. 6. As can be seen from FIG. 6, all of the processor chips have the same virtual to real address mappings and thus, a unified system configuration is achieved as part of the unified configuration phase 230. Each of the processor chips stores the virtual to real address mappings for itself and each of the other processor chips so that a global mapping is achieved. This global mapping allows, for example, the master chip, to access the architected register of the slave processor chips and allows the slave processor chips to execute code from the memory made available by the master processor chip. After this takeover mechanism 232 operation is completed, the master processor chip controls the entire system including all of the slave processor chips. That is, the firmware of the processor chips is fully merged.

During the previous phases 210-220, the previously independent firmware applications selected information about the system or hardware connected to the individual chip, e.g., the setup information for the individual processor chips PCIe buses, memory controllers, and the like. This information was stored into a data structure referred to as a system configuration table. The early system configuration table template is available during the multi-chip agnostic phase 210 and contains partial good information in which portions of the chip that are determined to not be working properly are excluded from the early system configuration table template. For each device initialization performed, including memory controller setup, PCIe bus setup, etc., the system configuration table data structure is adjusted to reflect the system from the individual chip's perspective. Thus, separate system configuration table data structures from the perspective of each individual processor chip are generated. The master processor chip, during the unified configuration phase 230, merges these separately generated system configuration tables into one unified system configuration table data structure 234 which is used to inform firmware clients, e.g., hypervisors, operating systems 250, or the like, as soon as those clients are loaded and started.

Thus, the illustrative embodiments provide a multi-chip initialization and boot process that permits parallel firmware boot of the processor chips until late in the boot process. The processor chips are initially booted with each processor chip assuming that it is the only processor chip in the system. Thereafter, a multi-chip aware phase is implemented where each of the processor chips knows that it is one of many processor chips in the system and sets up its own separate address space mapping as well as performs its own execution of boot code to generate a system configuration table and perform other boot operations. Following this phase, a master processor chip is selected and the remaining processor chips are reconfigured to be slave processor chips that are controlled by the master processor chip.

Figure 7:
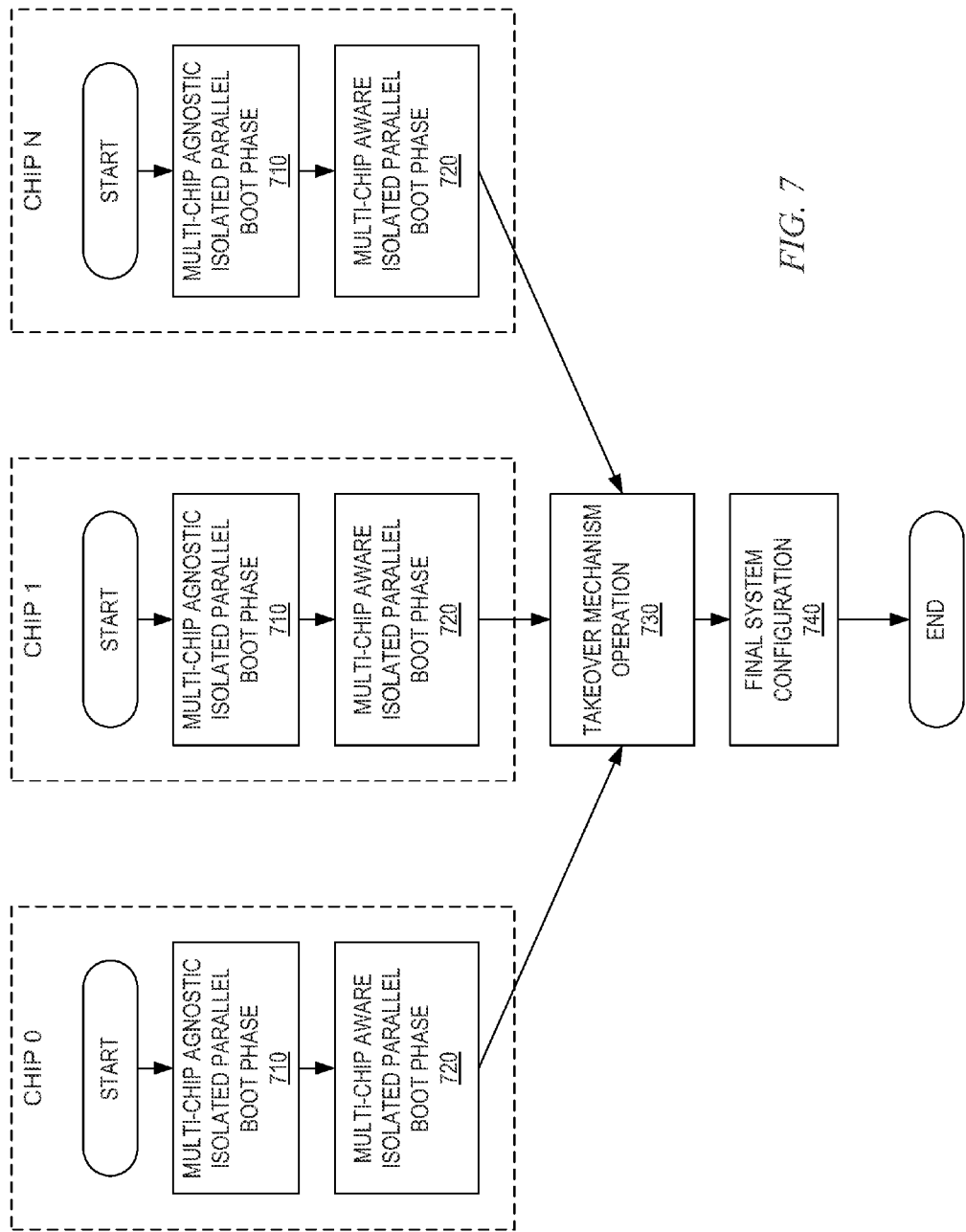
FIG. 7 is a flowchart outlining an example operation for performing a multi-chip parallel boot process in accordance with one illustrative embodiment.

FIG. 7 is a flowchart outlining an example operation for performing a multi-chip parallel boot process in accordance with one illustrative embodiment. As shown in FIG. 7, the operation starts with each of the processor chips performing a multi-chip agnostic isolated parallel boot phase (step 710). As discussed above, this may involve an initial boot operation in which address mapping structures and other structures are configured as if the processor chip were the only processor chip in the multi-chip system, followed by a chip identifier detection operation to detect the chip id corresponding to the port the processor chip is associated with on a boot-assist-logic or other multiplexer logic.

Following the multi-chip agnostic isolated parallel boot phase, each of the processor chips executes a multi-chip aware isolated parallel boot phase (step 720). As discussed above, this may involve a memory initialization operation, device initialization operation, and setup and training operation. As part of this phase, the virtual to real address mapping of the individual processor chips are configured to point to a local memory of the processor chip such that each processor chip may execute its own copy of boot code independent of each of the other processor chips. During these phases, each of the processor chips is building a single chip aware system configuration table data structure (step 730).

The separate isolated boot operations of steps 710-720 are combined as part of the takeover mechanism operation (step 730) in which one of the processor chips is selected as a master processor chip, the other processor chips are configured as slave processor chips that are controlled by the master processor chip, and system configuration table structures created by each of the individual processor chips are combined into a single unified system configuration table. Each of the virtual to real address mappings of the processor chips is updated to be the same in each of the processor chips.

The final system configuration is then stored and output to the hypervisor, operating system, or other application software for use in executing code on the multi-chip system (step 740). This final system configuration may comprise a unified system configuration table and virtual to real address mapping is stored in each of the processor chips. The operation then terminates.

Figure 8:
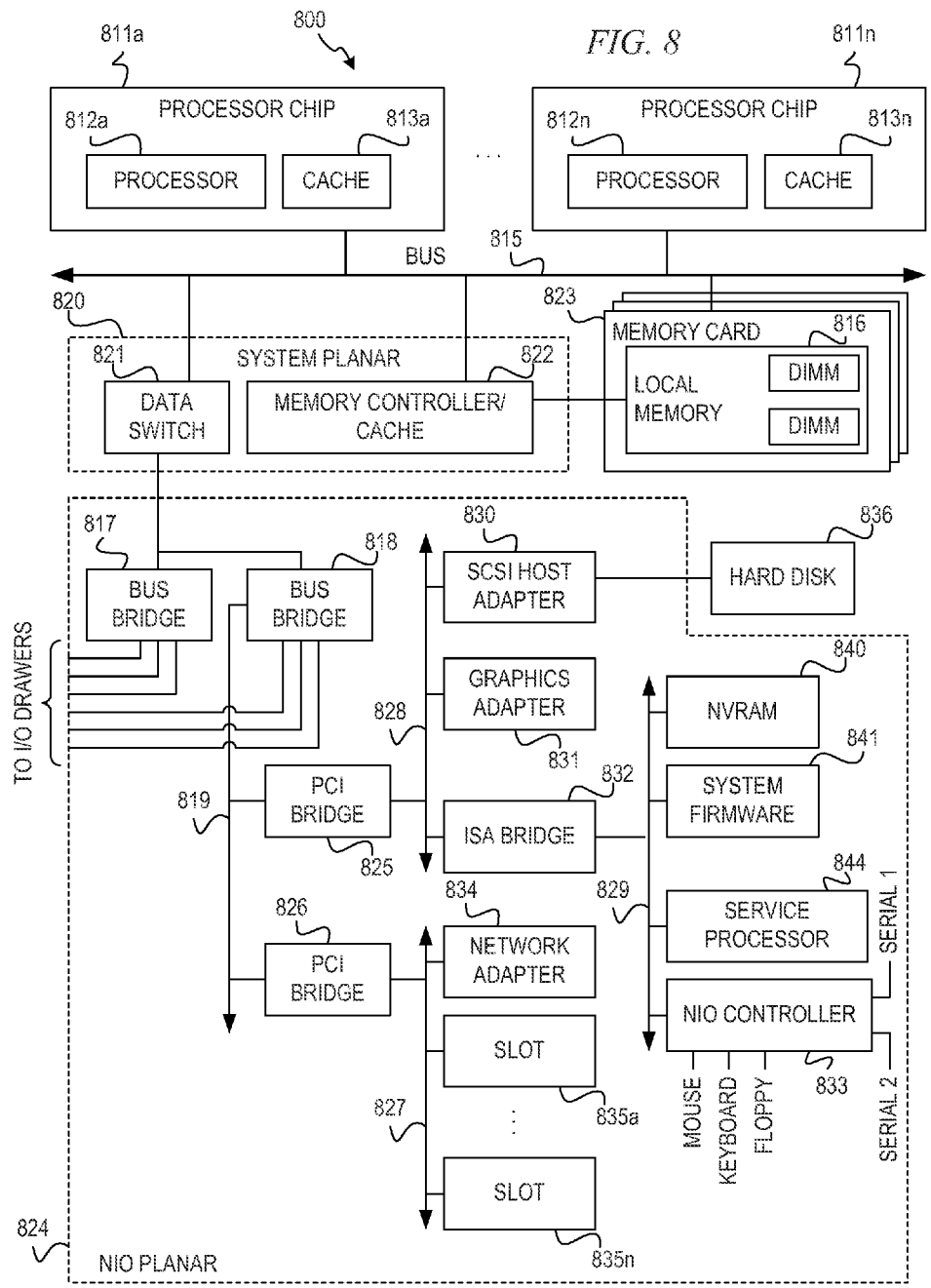
FIG. 8 is an example block diagram of a data processing system in which aspects of the illustrative embodiments may be implemented.

FIG. 8 is an example block diagram of a data processing system in which aspects of the illustrative embodiments may be implemented. The example data processing system in FIG. 8 is an example of a symmetric multi-processor (SMP) system, however the illustrative embodiments are not limited to such. Rather, the illustrative embodiments may likewise be utilized in heterogeneous multi-processor systems, such as the Cell Broadband Engine (CBE) available from International Business Machines Corporation of Armonk, N.Y., or the like.

As shown in FIG. 8, data processing system 800 includes processor chips 811a-811n. Each of processor chips 811a-811n includes one or more processor cores and a cache memory. For example, processor chip 811a contains processor core 812a and cache memory 813a, and processor chip 811n contains processor 812n and cache memory 813n. The processor chips 811a-811n may further comprise other units such as shown in FIGS. 1A-1B, as well as other appropriate units, without departing from the spirit and scope of the illustrative embodiments.

Processor chips 811a-811n are connected to main bus 815. Main bus 815 supports a system planar 820 that contains processor chips 811a-811n and memory cards 823. The system planar also contains data switch 821 and memory controller/cache 822. Memory controller/cache 822 supports memory cards 823 that include local memory 816 having multiple dual in-line memory modules (DIMMs).

Data switch 821 connects to bus bridge 817 and bus bridge 818 located within a native I/O (NIO) planar 824. As shown, bus bridge 818 connects to peripheral components interconnect (PCI) bridges 825 and 826 via system bus 819. PCI bridge 825 connects to a variety of I/O devices via PCI bus 828. As shown, hard disk 836 may be connected to PCI bus 828 via small computer system interface (SCSI) host adapter 830. A graphics adapter 831 may be directly or indirectly connected to PCI bus 828. PCI bridge 826 provides connections for external data streams through network adapter 834 and adapter card slots 835a-835n via PCI bus 827.

An industry standard architecture (ISA) bus 829 connects to PCI bus 828 via ISA bridge 832. ISA bridge 832 provides interconnection capabilities through NIO controller 833 having serial connections Serial 1 and Serial 2. A floppy drive connection, keyboard connection, and mouse connection are provided by NIO controller 833 to allow data processing system 800 to accept data input from a user via a corresponding input device. In addition, non-volatile RAM (NVRAM) 140 provides a non-volatile memory for preserving certain types of data from system disruptions or system failures, such as power supply problems. A system firmware 841 is also connected to ISA bus 829 for implementing the initial Basic Input/Output System (BIOS) functions. A service processor 844 connects to ISA bus 829 to provide functionality for system diagnostics or system servicing.

The operating system (OS) is stored on hard disk 836, which may also provide storage for additional application software for execution by data processing system. NVRAM 840 is used to store system variables and error information for field replaceable unit (FRU) isolation. During system startup, the bootstrap program loads the operating system and initiates execution of the operating system. To load the operating system, the bootstrap program first locates an operating system kernel type from hard disk 836, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a multi-chip data processing system, for performing a boot process for booting each of a plurality of processor chips of the multi-chip data processing system, comprising:

performing, in parallel, a multi-chip agnostic isolated boot phase operation to perform an initial boot of each of the plurality of processor chips as if each of the processor chips were an only processor chip in the multi-chip data processing system;

performing, in parallel, a multi-chip aware isolated boot phase operation of each of the processor chips where each of the processor chips has its own separately configured physical address space; and performing a unified configuration phase operation to select a master processor chip from the plurality of processor chips and configure other processor chips in the plurality of processor chips to operate as slave processor chips that are controlled by the master processor chip, wherein performing a multi-chip agnostic isolated boot phase operation comprises:

initializing a chip identifier of each of the processor chips in the plurality of processor chips to have a same master chip identifier; and setting a virtual to physical address mapping structure of a memory management unit of each of the processor chips such that for each pair of virtual address and physical address, the virtual address is the same as the physical address.

2. The method of claim 1, wherein performing a multi-chip agnostic isolated boot phase operation comprises reading, by each processor chip in the plurality of processor chips, a unique chip identifier for the processor chip from a boot-assist-logic shared by the processor chips, and wherein the boot-assist-logic provides an interface for each of the processor chips to access boot code in a flash memory.

3. The method of claim 2, wherein the unique chip identifier for a processor chip in the plurality of processor chips is a port number associated with a port of the boot-assist-logic to which the processor chip is coupled.

4. The method of claim 2, wherein the unique chip identifier for the processor chip in the plurality of processor chips is derived based on an order in which arbitration for a semaphore is won amongst the plurality of chips, and wherein the semaphore protects access to a shared storage location.

5. The method of claim 2, wherein performing a multi-chip aware isolated boot phase operation of each of the processor chips where each of the processor chips has its own separately configured physical address space comprises:

reconfiguring a virtual to real address mapping of each of the processor chips based on a corresponding chip identifier of the processor chip such that each processor chip has its own separately configured address space.

6. The method of claim 5, wherein performing the multi-chip aware isolated boot phase operation further comprises:

moving boot code from a flash memory from which the boot code was being executed as part of the multi-chip agnostic isolated boot phase operation into the separately configured address spaces of each of the processor chips; and continuing execution of the boot code in each of the processor chips from the separate configured address spaces of the processor chips.

7. The method of claim 1, wherein separate system configuration table data structures are generated for each of the processor chips in the plurality of processor chips during the multi-chip agnostic isolated boot phase operation and multi-chip aware isolated boot phase operation, and wherein performing a unified configuration phase operation further comprises merging the separate system configuration table data structures of each of the processor chips into a single merged system configuration table data structure, and providing the single merged system configuration table data structure to an operating system of the multi-chip data processing system for use in managing devices of the multi-chip data processing system.

8. A method, in a multi-chip data processing system, for performing a boot process for booting each of a plurality of processor chips of the multi-chip data processing system, comprising:

performing, in parallel, a multi-chip agnostic isolated boot phase operation to perform an initial boot of each of the plurality of processor chips as if each of the processor chips were an only processor chip in the multi-chip data processing system;

performing, in parallel, a multi-chip aware isolated boot phase operation of each of the processor chips where each of the processor chips has its own separately configured physical address space; and performing a unified configuration phase operation to select a master processor chip from the plurality of processor chips and configure other processor chips in the plurality of processor chips to operate as slave processor chips that are controlled by the master processor chip, wherein performing a unified configuration phase operation to select a master processor chip from the plurality of processor chips and configure other processor chips in the plurality of processor chips to operate as slave processor chips that are controlled by the master processor chip comprises:

stopping execution of code on the slave processor chips;

reconfiguring a virtual to physical address mapping of the slave processor chips to map virtual addresses to physical addresses of a memory of the master processor chip; and executing, by the slave processor chips, code from the memory of the master processor chip using the reconfigured virtual to address mappings of the slave processor chips.

9. A computer program product comprising a non-transitory computer readable medium having a computer readable program stored therein, wherein the computer readable program, when executed on a multi-chip data processing system, causes the multi-chip data processing system to:

perform, in parallel, a multi-chip agnostic isolated boot phase operation to perform an initial boot of each of the plurality of processor chips as if each of the processor chips were an only processor chip in the multi-chip data processing system;

perform, in parallel, a multi-chip aware isolated boot phase operation of each of the processor chips where each of the processor chips has its own separately configured physical address space; and perform a unified configuration phase operation to select a master processor chip from the plurality of processor chips and configure other processor chips in the plurality of processor chips to operate as slave processor chips that are controlled by the master processor chip, wherein performing a multi-chip agnostic isolated boot phase operation comprises:

initializing a chip identifier of each of the processor chips in the plurality of processor chips to have a same master chip identifier; and setting a virtual to physical address mapping structure of a memory management unit of each of the processor chips such that for each pair of virtual address and physical address, the virtual address is the same as the physical address.

10. The computer program product of claim 9, wherein performing a multi-chip agnostic isolated boot phase operation comprises reading, by each processor chip in the plurality of processor chips, a unique chip identifier for the processor chip from a boot-assist-logic shared by the processor chips, and wherein the boot-assist-logic provides an interface for each of the processor chips to access boot code in a flash memory.

11. The computer program product of claim 10, wherein the unique chip identifier for a processor chip in the plurality of processor chips is a port number associated with a port of the boot-assist-logic to which the processor chip is coupled.

12. The computer program product of claim 10, wherein the unique chip identifier for the processor chip in the plurality of processor chips is derived based on an order in which arbitration for a semaphore is won amongst the plurality of chips, and wherein the semaphore protects access to a shared storage location.

13. The computer program product of claim 10, wherein performing a multi-chip aware isolated boot phase operation of each of the processor chips where each of the processor chips has its own separately configured address space comprises:

reconfiguring a virtual to real address mapping of each of the processor chips based on a corresponding chip identifier of the processor chip such that each processor chip has its own separately configured address space.

14. The computer program product of claim 13, wherein performing the multi-chip aware isolated boot phase operation further comprises:

moving boot code from a flash memory from which the boot code was being executed as part of the multi-chip agnostic isolated boot phase operation into the separately configured address spaces of each of the processor chips; and continuing execution of the boot code in each of the processor chips from the separate configured address spaces of the processor chips.

15. The computer program product of claim 9, wherein separate system configuration table data structures are generated for each of the processor chips in the plurality of processor chips during the multi-chip agnostic isolated boot phase operation and multi-chip aware isolated boot phase operation, and wherein performing a unified configuration phase operation further comprises merging the separate system configuration table data structures of each of the processor chips into a single merged system configuration table data structure, and providing the single merged system configuration table data structure to an operating system of the multi-chip data processing system for use in managing devices of the multi-chip data processing system.

16. A computer program product comprising a non-transitory computer readable medium having a computer readable program stored therein, wherein the computer readable program, when executed on a multi-chip data processing system, causes the multi-chip data processing system to:

perform, in parallel, a multi-chip agnostic isolated boot phase operation to perform an initial boot of each of the plurality of processor chips as if each of the processor chips were an only processor chip in the multi-chip data processing system;

perform, in parallel, a multi-chip aware isolated boot phase operation of each of the processor chips where each of the processor chips has its own separately configured physical address space; and perform a unified configuration phase operation to select a master processor chip from the plurality of processor chips and configure other processor chips in the plurality of processor chips to operate as slave processor chips that are controlled by the master processor chip, wherein performing a unified configuration phase operation to select a master processor chip from the plurality of processor chips and configure other processor chips in the plurality of processor chips to operate as slave processor chips that are controlled by the master processor chip comprises:

stopping execution of code on the slave processor chips;

reconfiguring a virtual to physical address mapping of the slave processor chips to map virtual addresses to physical addresses of a memory of the master processor chip; and executing, by the slave processor chips, code from the memory of the master processor chip using the reconfigured virtual to address mappings of the slave processor chips.

* * * * *